United States Patent
Duan et al.

(10) Patent No.: US 10,885,072 B2
(45) Date of Patent: Jan. 5, 2021

(54) SPATIAL COMPUTING FOR LOCATION-BASED SERVICES

(71) Applicant: International Business Machines Corporation, Armonk, NY (US)

(72) Inventors: Ning Duan, Beijing (CN); Yu Huang, Beijing (CN); Zhi Hu Wang, Beijing (CN); Shiping Yan, Ningbo (CN); Xin Zhang, Beijing (CN); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 522 days.

(21) Appl. No.: 15/333,736

(22) Filed: Oct. 25, 2016

(65) Prior Publication Data

US 2018/0113883 A1  Apr. 26, 2018

(51) Int. Cl.
*G06F 16/29* (2019.01)
*G06F 16/901* (2019.01)

(52) U.S. Cl.
CPC .......... *G06F 16/29* (2019.01); *G06F 16/9027* (2019.01)

(58) Field of Classification Search
CPC ........ G06Q 30/02; G06Q 50/01; G06F 16/29; G06F 16/5854; G06F 16/9535; G06F 16/2379; G06F 16/2458; G06F 16/9537; G06F 16/22; G06F 16/2246; G06F 3/04815; G06F 3/0482; G06F 3/04842; G06F 3/0485; G06F 3/04886; G06F 9/50; G06F 9/5066; G06F 16/3329; G06F 3/167; G06F 16/951; G06F 3/017; G06F 9/542;

(Continued)

(56) References Cited

U.S. PATENT DOCUMENTS

| 7,426,455 | B1 * | 9/2008 | Antony | G06F 17/10 345/443 |
| 7,576,754 | B1 * | 8/2009 | Joseph | G01C 21/32 345/619 |

(Continued)

OTHER PUBLICATIONS

Geohash Index Based Spatial Data Model for Corporate, IEEE Aug. 10-11, 2015.*

(Continued)

*Primary Examiner* — Shyue Jiunn Hwa
(74) *Attorney, Agent, or Firm* — Amin, Turocy & Watson, LLP

(57) ABSTRACT

Techniques facilitating resolution-based spatial computing are provided. In one example, a computer-implemented method comprises traversing, by a device operatively coupled to a processor, a data structure corresponding to a land area for a location having an index; and determining, by the device, whether the location is at least partially within the land area based on a result of the traversing. In some embodiments, the traversing comprises: obtaining a threshold number of levels based at least in part on a resolution parameter; scanning a first level of the data structure for a node having an index corresponding to the index of the location; and iterating the scanning for respective subsequent levels of the data structure based on the scanning returning a node having subordinate nodes and a number of levels for which the scanning and iterating have been performed being less than the threshold number of levels.

20 Claims, 15 Drawing Sheets

(58) Field of Classification Search
CPC ........... G06F 16/3343; G06F 16/90324; G06F 19/00; G06F 40/211; G06F 30/02
See application file for complete search history.

(56) References Cited

U.S. PATENT DOCUMENTS

| | | | |
|---|---|---|---|
| 8,350,849 B1* | 1/2013 | Jones | G06F 3/04815 345/419 |
| 2009/0016161 A1* | 1/2009 | Gendron | G01S 7/539 367/88 |
| 2014/0274154 A1 | 9/2014 | Rana et al. | |
| 2014/0280318 A1 | 9/2014 | Simms et al. | |
| 2015/0161122 A1 | 6/2015 | Merriman et al. | |
| 2015/0254276 A1 | 9/2015 | Oliver et al. | |
| 2016/0321351 A1* | 11/2016 | Mor | G06F 16/29 |

OTHER PUBLICATIONS

Geohash Index Based Spatial Data Model for Corporate of Suwardi et al. The 5th International Conference on Electrical Engineering and Informatics 2015 Aug. 10-11, 2015.*

* cited by examiner

300

| Context | Context Measures | Resolution |
|---|---|---|
| Road conditions | Road type, road terrain, ... | ~X0 m |
| Land usage | Population density, ... | ~X km |
| Traffic conditions | Traffic patterns, ... | ~X0 m |
| Weather | Weather type, temperature, barometric pressure, ... | ~X km |
| Weather alerts | Hail, hurricanes, blizzards, ... | ~X km |
| Air quality | PM2.5, AQI, ... | ~X00 m |
| Traffic events | Driving behaviors, incidents, ... | ~X m |
| ... | ... | ... |

| Scale level / encode length | Resolution / error range |
|---|---|
| 1 | ± 2500 km |
| 2 | ± 630 km |
| 3 | ± 78 km |
| 4 | ± 20 km |
| 5 | ± 2.4 km |
| 6 | ± 0.61 km |
| 7 | ± 0.076 km |
| 8 | ± 0.019 km |
| 9 | ± 0.004 km |

SPATIAL COMPUTING FOR LOCATION-BASED SERVICES

BACKGROUND

The subject disclosure relates to location-based services, and more specifically, to resolution-based spatial computing for location-based services.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment, a system can comprise a memory that stores computer executable components and a processor that executes computer executable components stored in the memory. The computer executable components can comprise a scanning component that performs a scan of a first level of a data structure of a land area for a node having an index corresponding to an index of a location and iteratively performs the scan for respective subsequent levels of the data structure based on the scan performed for a preceding level returning a node having subordinate nodes and a resolution associated with a present level of the data structure being greater than an accepted resolution. The computer executable components can also comprise a location determination component that determines whether the location is at least partially within the land area based on an outcome of the scan performed by the scanning component.

According to another embodiment, a computer-implemented method can comprise traversing, by a device operatively coupled to a processor, a data structure corresponding to a land area for a location having an index. The traversing can comprise obtaining a threshold number of levels based on a resolution parameter; and scanning a first level of the data structure for a node having an index corresponding to the index of the location. The traversing can also comprise iterating the scanning for respective subsequent levels of the data structure based on the scanning returning a node having subordinate nodes and a number of levels for which the scanning and iterating have been performed being less than the threshold number of levels. The computer-implemented method can also comprise determining, by the device, whether the location is at least partially within the land area based on a result of the traversing.

According to yet another embodiment, a computer program product can comprise a computer readable storage medium having program instructions embodied therewith. The program instructions can be executable by a processing component to cause the processing component to search, by the processing component, a first level of a data structure corresponding to a land area for a node having an index corresponding to an index of a location; and determine, by the processing component, a threshold number of levels of the data structure to search based at least in part on a spatial resolution parameter. The program instructions can be executable by a processing component to cause the processing component to iterate, by the processing component, searching of respective subsequent levels of the data structure based on searching of a preceding level returning a node having subordinate nodes and a number of levels for which the searching has been performed being smaller than the threshold number of levels; and determine, by the computer, whether the location is at least partially within the land area based on a result of the searching.

DESCRIPTION OF THE DRAWINGS

FIG. 3 is a diagram illustrating example, non-limiting contexts in accordance with one or more embodiments described herein.

DETAILED DESCRIPTION

Figure 1:
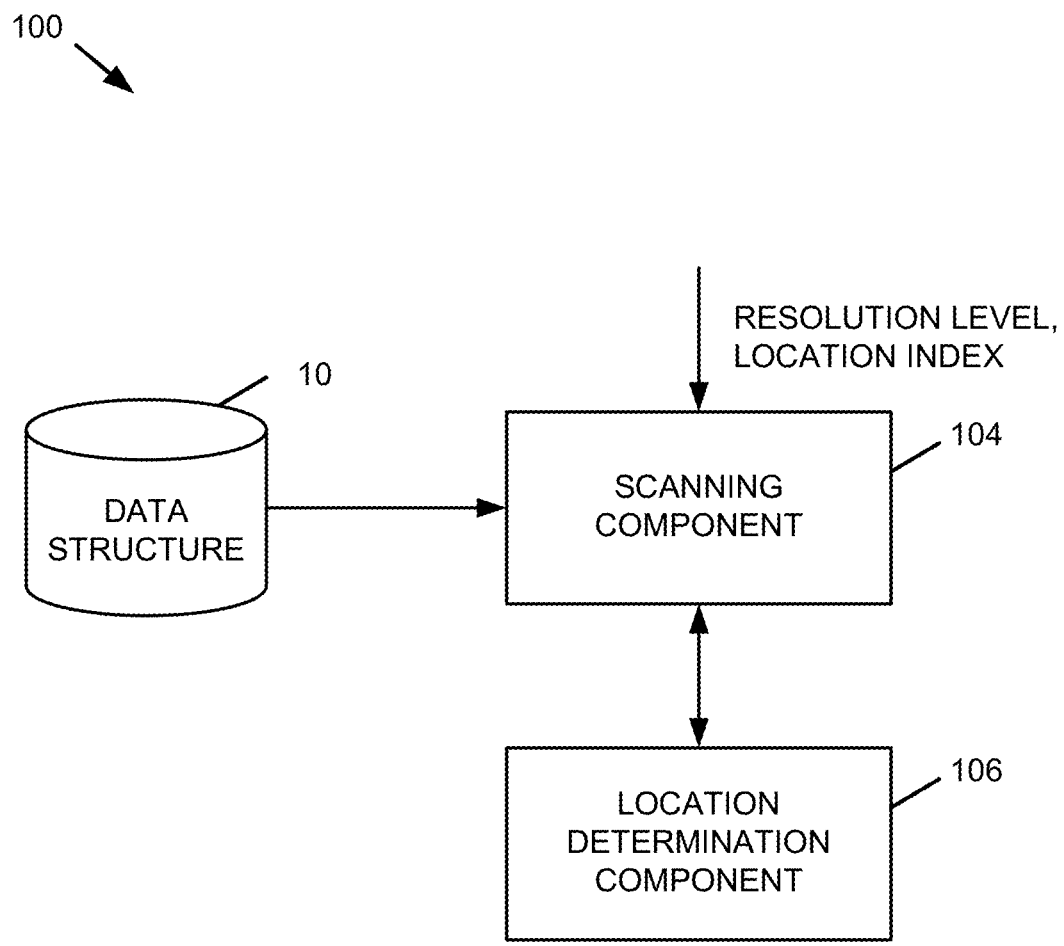
FIG. 1 is a block diagram of an example, non-limiting system that facilitates context-relevant positioning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Advancements in computing and wireless networking technology have facilitated the implementation of smart devices, e.g., consumer electronic devices and/or other devices with computing and wireless communication ability. As the hardware associated with computing and communication tasks has become smaller and less expensive, it has become feasible to incorporate such technology in devices that did not previously have such capabilities, such as televisions, automobile audio/visual systems, light fixtures, and so on. These smart devices can be connected via a network or internetwork to each other and/or to other computing devices. The term "Internet of Things" (IOT) is commonly used to refer to a network of smart devices that can communicate data with other devices in the network.

In IOT scenarios, there are various contexts that can provide useful information for devices in the network. These contexts can include, but are not limited to, road networks, land usage, traffic conditions, weather, air quality, etc. However, as context-related information can vary by location, it is desirable to ascertain the location of a device so that context-related information relevant to the location of the device can be provided.

In one or more embodiments described herein, spatial computing devices can define and/or utilize various geometries (e.g., point, line, polygon, grid, etc.) in connection with position estimation techniques. These geometries are generally defined using the set of location points that make up the boundaries of the geometry. For instance, a polygon can be defined using the set of latitude/longitude points corresponding to the vertices of the polygon, a line can be defined using the set of latitude/longitude points that begin/end respective segments of the line, and so on.

In addition, in some embodiments, some spatial computing operations are used to determine the relationship between two geometries. For instance, a spatial computing device can determine whether a first geometry is within (e.g., encompassed by) a second geometry, whether a first geometry intersects a second geometry, etc. Various systems and methods described herein utilize geographical data structures (e.g., geohash grids) to simulate the shape of various types of geometries (e.g., polygon, line, grid, etc.). One or more of the spatial computing processes described herein can utilize a geohash tree to simulate and index geometries according to controllable resolution parameters for various contexts. As a result, position estimation relative to an indexed geometry can be performed via the geohash tree without the use of pointwise calculations. This can result in position estimation for a given context with reduced computing resource usage without sacrificing precision associated with the context.

FIG. 1 illustrates a block diagram of an example, non-limiting system 100 that facilitates context-relevant spatial computing in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The system 100 and/or the components of the system 100 can employ the use hardware and/or software to solve problems that are highly technical in nature (e.g., related to spatial computing, etc.), that are not abstract and that cannot be performed as a set of mental acts by a human. Further, some of the processes performed may be performed by specialized computers for carrying out defined tasks related to spatial computing. The system 100 and/or components of the system can be employed to solve new problems that arise through advancements in technology, computer networks, the Internet and the like. The system 100 can provide technical improvements to spatial computing systems by reducing processing time/cycles associated with position determination, reducing file size associated with geohash trees and/or other related data structures, improving relevance of positioning calculations for particular contexts, etc.

As shown in FIG. 1, the system 100 can include a scanning component 104 and a location determination component 106. The scanning component 104 can obtain information (e.g., as input) and/or otherwise access or be associated with information relating to an accepted resolution level (e.g., a resolution level associated with an IOT context and/or other parameter). The scanning component 104 can additionally utilize information relating to a target location that is associated with a geohash index.

The scanning component 104 can traverse a data structure 10 associated with the scanning component 104 using the information obtained by the scanning component 104. In various embodiments, the data structure 10 can be generated and/or stored by the scanning component 104, or alternatively the data structure 10 can be constructed by a different entity and provided to the scanning component via a network and/or communicatively coupled storage media.

In some embodiments, the scanning component 104 can traverse the data structure 10 by first performing a scan of a first level of the data structure 10 for a node having an index corresponding to the index of the target location. In various embodiments, the scanning component 104 can then iterate the scan for subsequent levels of the data structure 10 until either no node corresponding to the given location index is found, a full cover node (e.g., a node having no subordinate nodes) corresponding to the given location index is found, and/or a data structure 10 level associated with the accepted resolution level is reached.

The levels of a data structure 10 for a particular area of interest scanned by the scanning component 104 can be determined based on various contexts associated with the area of interest. More particularly, in some embodiments, the scanning component 104 can identify resolution levels associated with respective contexts for the area of interest and begin scanning of the corresponding data structure 10 at a level corresponding to a largest resolution level among the identified resolution levels. In this manner, the first data structure 10 level described above can refer to a data structure 10 level corresponding to a largest resolution associated with contexts for the area of interest. This level can be associated with a top (e.g., root) level of the data structure 10 or a different level. Various techniques utilized by the scanning component 104 for data structure traversal are described in further detail below.

As will be described in further detail below, the data structure 10 can be constructed according to one or more suitable algorithms and can take any suitable format(s). Formats that can be utilized for the data structure 10 can include, but are not limited to, a linked list, a tree, a binary tree, a hash tree, a geohash tree, a spatial hash tree, etc.

Additionally, data represented by the data structure 10 can be indexed, encoded, and/or organized in any other suitable manner. As used herein, the term "encoding tree" refers to a tree structure formed of indexes, hashes, and/or other identifiers for respective data items included and/or otherwise represented in the data structure 10. While various specific, non-limiting examples are described herein in the context of a geohash tree constructed using a geohash algorithm, other forms of hash trees, such as those constructed based on a Hilbert curve and/or by other means, as well as other forms of data structures, can also be used.

The location determination component 106 can utilize the outcome of the scanning performed by the scanning component 104 to determine whether the target location is at least partially within the land area for which scanning was performed by the scanning component 104 (e.g., the location intersects and/or is within the land area). For instance, the location determination component 106 can determine that the location is not within the land area if the scanning component 104 terminates upon failing to find a node corresponding to the index of the location in the data structure 10. Alternatively, the location determination component 106 can determine that the location is fully within/encompassed by the land area if the scanning component 104 terminates upon finding a full cover node corresponding to the index of the location. As another alternative, the location determination component 106 can determine that the location at least partially intersects the land area if the scanning component 104 terminates upon reaching the structure level corresponding to the accepted resolution level.

In an aspect, each (or, in some embodiments) of the components 104, 106 can be associated with, comprise and/or be operatively coupled to a computing device (e.g., a computing device associated with one or more processors). Furthermore, respective ones of the components 104, 106 can be associated with the same and/or different computing devices. For example, the scanning component 104 can be implemented on a first computing device and the location determination component 106 can be implemented on the first computing device or a second computing device, etc. The functionality of the respective ones of the components 104, 106 can also be distributed among multiple computing devices.

Figure 2:
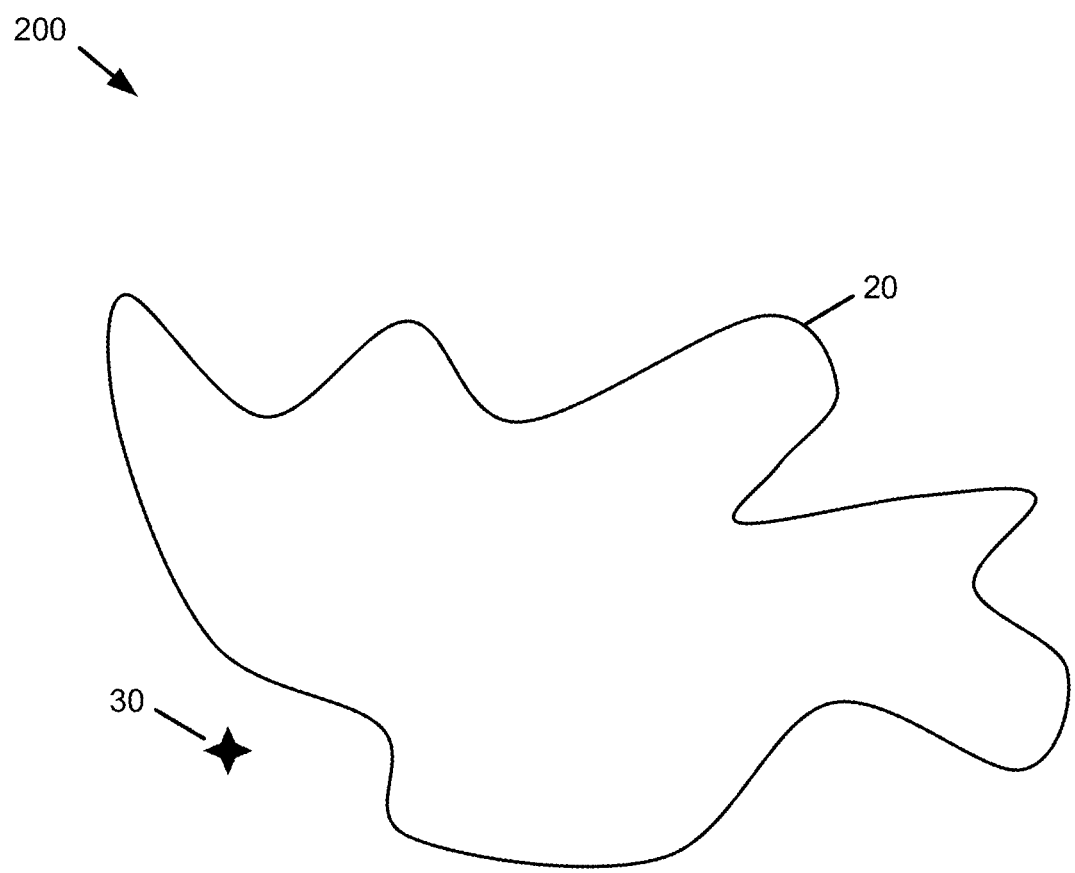
FIG. 2 is an illustration of an example, non-limiting land area and target location in accordance with one or more embodiments described herein.

In an aspect, system 100 can be utilized to perform spatial relationship judgments associated with a land area and a location (e.g., point) of interest. Diagram 200 in FIG. 2 illustrates an example, non-limiting land area 20 and geographic location 30 that can be utilized by system 100 in accordance with one or more embodiments. Repetitive description of like elements employed in respective embodiments is omitted for sake of brevity. While the discussion herein is provided with respect to the land area and geographic location 30, it should be appreciated that system 100 can perform spatial computations for any land area(s), geographic location(s), and/or combinations thereof, in any shape or configuration.

As described above, various contexts can leverage spatial relationships between pairs of geographic areas, such as whether one or more of the areas intersect each other and/or whether one area of the pair is located within the other. In an aspect, these relationships can be determined without the use of pointwise calculation for each point (or, in some embodiments, one or more points) associated with the areas being compared. As a result, computing effort/resources associated with the determination can be reduced. Further, the relevance of a determination for a particular context can be increased. By way of example, with reference to diagram 200, if land area 20 is a substantially large land area (e.g., having a size on the order of kilometers or greater) and a spatial computing system is to determine whether location 30 intersects and/or is within the land area 20, pointwise spatial computing would determine that the location 30 is not intersecting or is not within the land area 20. This result, however, can be undesirable for real IOT and/or other context-related scenarios due to physical error range and/or the resolution of the context itself. Table 300 in FIG. 3 illustrates various non-limiting examples of real-world contexts and their associated resolution scales in accordance with one or more embodiments described herein. Repetitive description of like elements employed in respective embodiments is omitted for sake of brevity. By utilizing these and/or other context-specific parameters, system 100 can provide a spatial relationship judgment that is relevant to a specific requested context.

To illustrate the above points in the non-limiting example of a weather application, positioning error within the physical error range of the location 30 can cause a spatial computing system to inaccurately determine that the location 30 is outside the land area 20 when it is in fact inside, or vice versa. Additionally, as a weather application typically provides information corresponding to an area around a given location, it can in some cases be desirable to treat the location 30 as intersecting the land area 20 even when the precise position of the location 30 falls just outside the land area 20. In contrast, the system 100 can take into account the resolution and/or spatial error range associated with the context of weather information to provide a spatial relationship judgment that has minimize errors for that context.

Figure 4:
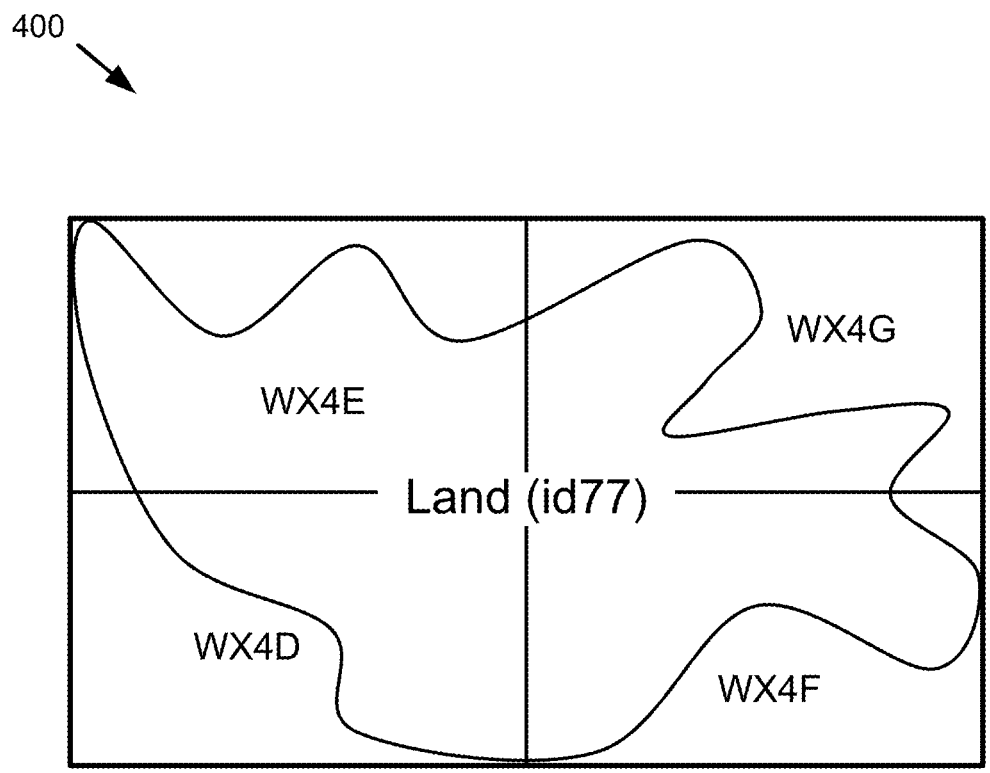
FIG. 4 is a diagram illustrating an example, non-limiting geographic encoding process in accordance with one or more embodiments described herein.

Construction of a grid structure (e.g., a geohash grid) for a land area is illustrated by diagram 400 in FIG. 4 in accordance with one or more embodiments. Repetitive description of like elements employed in respective embodiments is omitted for sake of brevity. While the following description relates specifically to geohash-based construction, other spatial hash structures can be constructed in a similar manner in various embodiments. As shown by diagram 400, geohash indexing is initially utilized for minimum bounding box (MBB) mapping of the target geometry shape. In the non-limiting example shown by diagram 400, the target shape is a land area, which has a complex polygonal geometry. The land area can be assigned an identifier. The identifier "id77" is used in diagram 400; however, any suitable identifier can be used. From the land area, geohash grid-based indexing is initialized by calculating the MBB for the land polygon, as illustrated by the outer bounding box encompassing the land polygon in diagram 400. As further shown by diagram 400, a geohash grid can be formed by dividing and/or separating the MBB for the land polygon into sections. While four sections are illustrated in the example shown by diagram 400, any suitable number of sections can be used. This grid can be mapped to a grid of geohash indexes to build an index table for the land polygon that relates each (or, in some embodiments) of the geohash grid segments to the land area. While the indexes WX4D, WX4E, WX4F, and WX4G are used in diagram 400, any suitable indexing scheme can be utilized.

One or more embodiments of the systems, apparatus, computer program products and/or computer-implemented methods described herein can perform novel spatial computing techniques that can utilize a hierarchical spatial hashing structure to determine the position of a location relative to a geographic region at a precision level appropriate to a particular context with reduced computational complexity. In some aspects, geohash grids can be employed to simulate the shapes of different types of geometries (e.g., polygons, lines, grids, etc.). As different contexts have different resolution and/or error range parameters, and in some cases resolution parameters can vary even within the same context, the hierarchical structure utilized herein can provide improved context relevance with reduced computing resource usage.

Figure 5A:
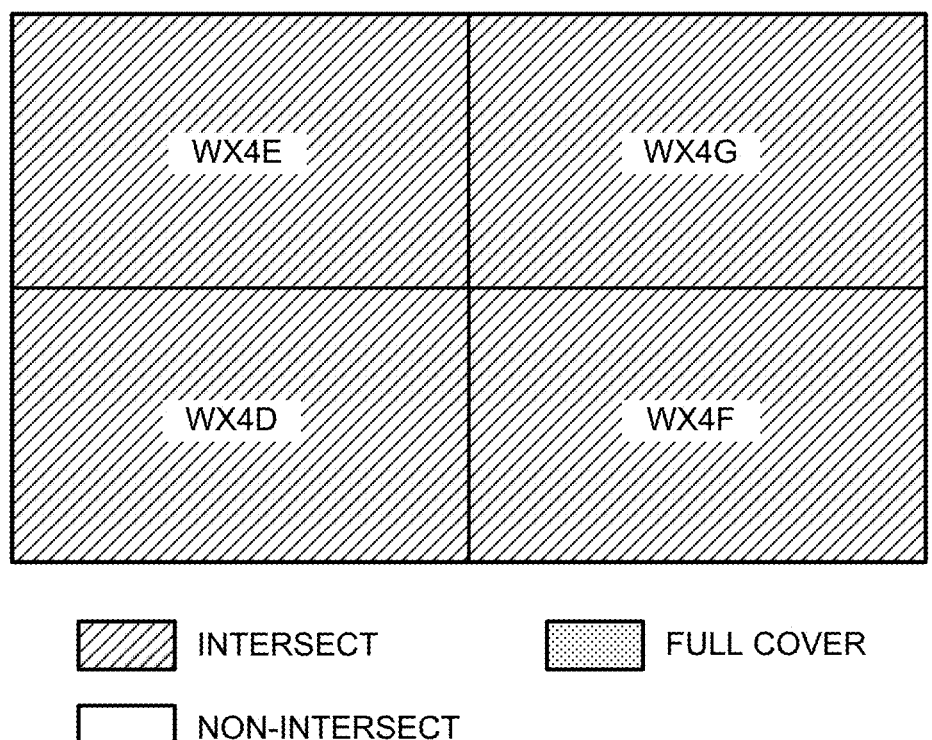
FIGS. 5A, 5B and 5C are diagrams illustrating an example, non-limiting geographic partitioning and encoding process in accordance with one or more embodiments described herein.

In an aspect, a hierarchical grid structure utilized for a land area according to the novel spatial computing procedures described herein can be constructed starting with a first ("top") level. The first level of the structure can be an uppermost (root) level of a spatial indexing scheme utilized to build the structure, or alternatively the structure can begin at a lower level. For instance, a first level of the structure can correspond to a largest (lowest) resolution utilized by contexts that can be associated with the land area represented by the structure. In a non-limiting example shown by diagram 502 in FIG. 5A, the first level of the geographic indexing structure can correspond to the fourth scaling level of the geographic indexing scheme in accordance with one or more embodiments. Repetitive description of like elements employed in respective embodiments is omitted for sake of brevity.

The position of a particular scaling level within the geographic indexing scheme can correspond to the length of the indexes used in that level. As a result, indexes of a four-character length are used in the example shown by diagram 502. While the indexes given in diagram 502 are the same as those given in diagram 400 for simplicity of explanation, one of skill in the art will appreciate that indexes can vary between implementations as indexes assigned to different geographical areas will vary based on the positions of those areas. Further, while a scaling level of four is used as a first structural level in diagram 502, it can be further appreciated that a structure as described herein can begin at any suitable level.

As further shown in diagram 502, respective indexed sections of the first level of the structure can be categorized according to their relation to the corresponding land area. In the example shown by diagram 502, regions are categorized according to whether they intersect the land area (e.g., are partially inside and partially outside the land area), are a full cover for the land area (e.g., are wholly inside the land area), or are a non-intersect of the land area (e.g., are wholly outside the land area). The categorizations used, and/or the naming conventions utilized for such categorizations, can differ from those given above.

Figure 5B:
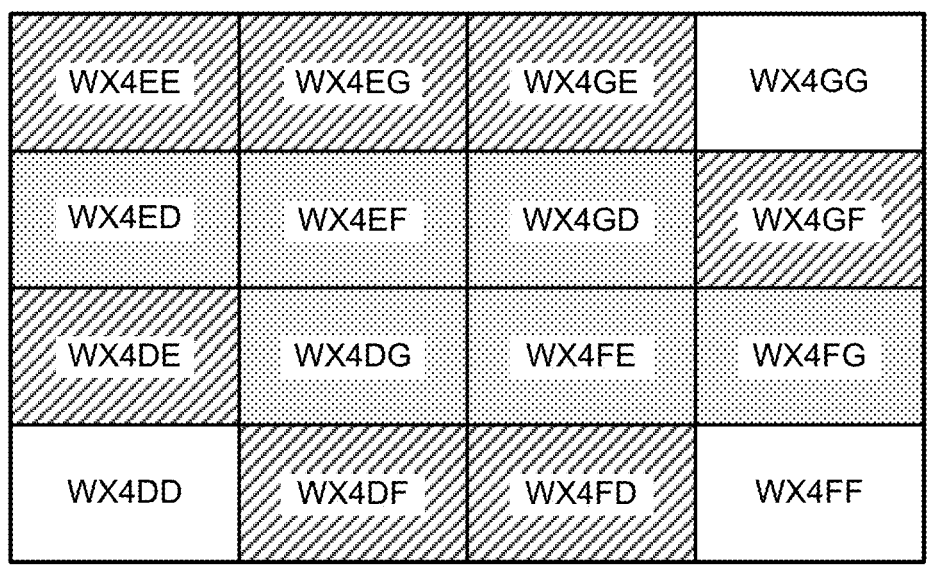

Upon completion of the initial level, regions categorized as intersect regions are further subdivided to generate a second structure level, as shown by diagram 504 in FIG. 5B. Here, as each region (or, in some embodiments, one or more regions) in diagram 502 was an intersect region, each of the regions (or, in some embodiments, one or more regions) are further divided or separated into a number of sub-regions. The example shown in diagram 504 shows that each (or, in some embodiments, one or more) of the regions of diagram 502 can be divided into four sub-regions respectively arranged in 2×2 configurations. It should be appreciated, however, that a region can be divided into any number and/or configuration of sub-regions between respective structure levels. Additionally, respective regions can be divided or separated such that sub-regions resulting from the division of a region are of a defined proportion relative to the region. For the example of a geohash-based grid structure, a sub-region can be a rectangular area having a resolution of (⅛×¼) or (¼×⅛) of the resolution of its master region. Alternatively, a grid structure based on a Hilbert curve can be proportioned such that a sub-region is a square area having a resolution of (½×½) or (¼×¼) the resolution of its master region. Any other proportioning scheme(s) can be used in addition to or in place of those described above.

Upon dividing or separating each intersect region (or, in some embodiments, one or more intersect regions) into respective sub-regions, the sub-regions can be assigned indexes in any suitable manner. In the example shown by diagram 504, the sub-regions for each region (or, in some embodiments, one or more regions) are assigned indexes in a similar manner to that of the previous structure level—e.g., region WX4D is divided or separated into sub-regions WX4DD through WX4DG, and so on. Other indexing schemes can also be used. Further, it should be appreciated that the proportioning of sub-regions and/or the indexing scheme utilized for assigning indexes to sub-regions can vary between levels of the structure.

Figure 5C:
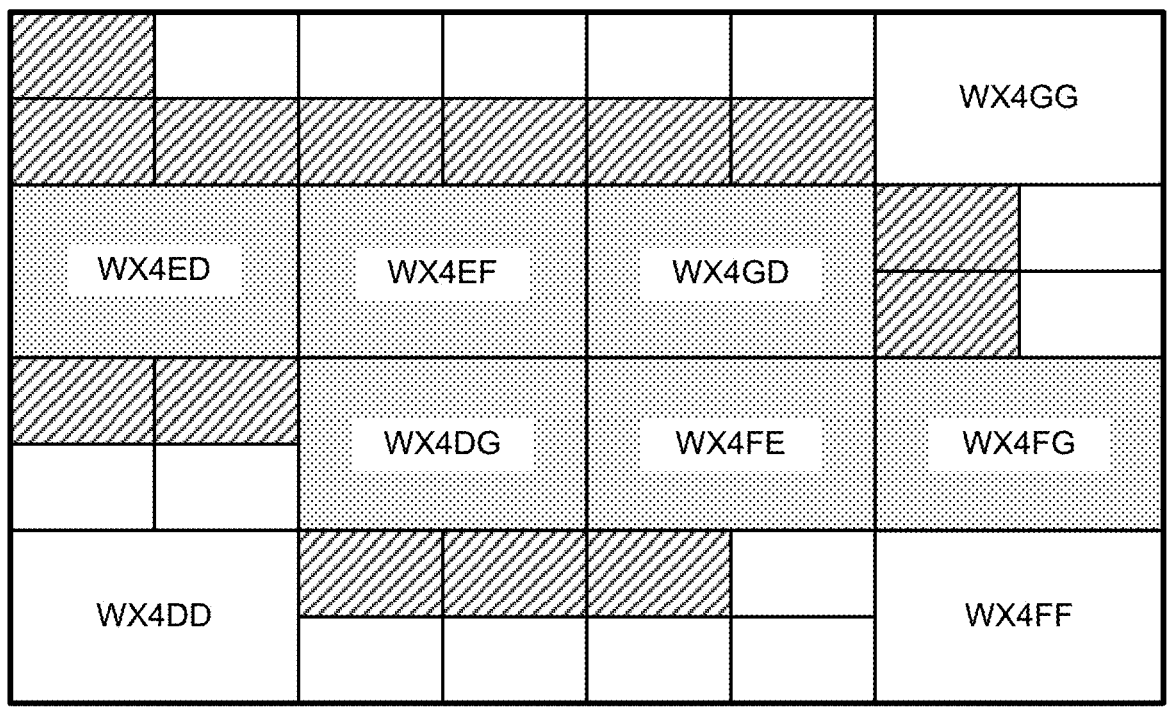

After sub-regions for the second level of the structure are created and indexed, the sub-regions can be categorized in a similar manner to that described above for the first structure level shown in diagram 502. Based on this categorization, an additional structure level can be constructed in which the sub-regions shown in diagram 504 are further divided into smaller/higher resolution sub-regions, as shown by diagram 506 in FIG. 5C. In the specific, non-limiting example shown by diagram 506, sub-regions are generated in a similar manner to that described above with respect to diagram 504. Other sub-region generation schemes can also be used. While not shown in diagram 506 for simplicity of illustration, the respective generated sub-regions can be assigned indexes in a similar manner to that described above with respect to diagrams 502, 504, and/or in a different manner.

The sub-region generation, indexing, and classification shown by diagrams 502, 504, 506 can proceed for any number of structure levels. In an aspect, structure level generation proceeds until a predetermined bottommost/last level is reached. By way of specific, non-limiting example, the structure generation shown by diagrams 502, 504, 506 can begin at a first layer corresponding to a largest/lowest resolution associated with contexts relevant to the corresponding land area and end at a second layer corresponding to a smallest/highest resolution associated with such contexts. Other schemes can also be used.

In the example shown by diagram 506, the structure level generated by diagram 506 is the last level of the layer. Accordingly, the previous sub-region classification is omitted and all sub-regions generated in this layer are classified as intersect regions. Alternatively, classification can proceed for the final structure layer.

Figure 6:
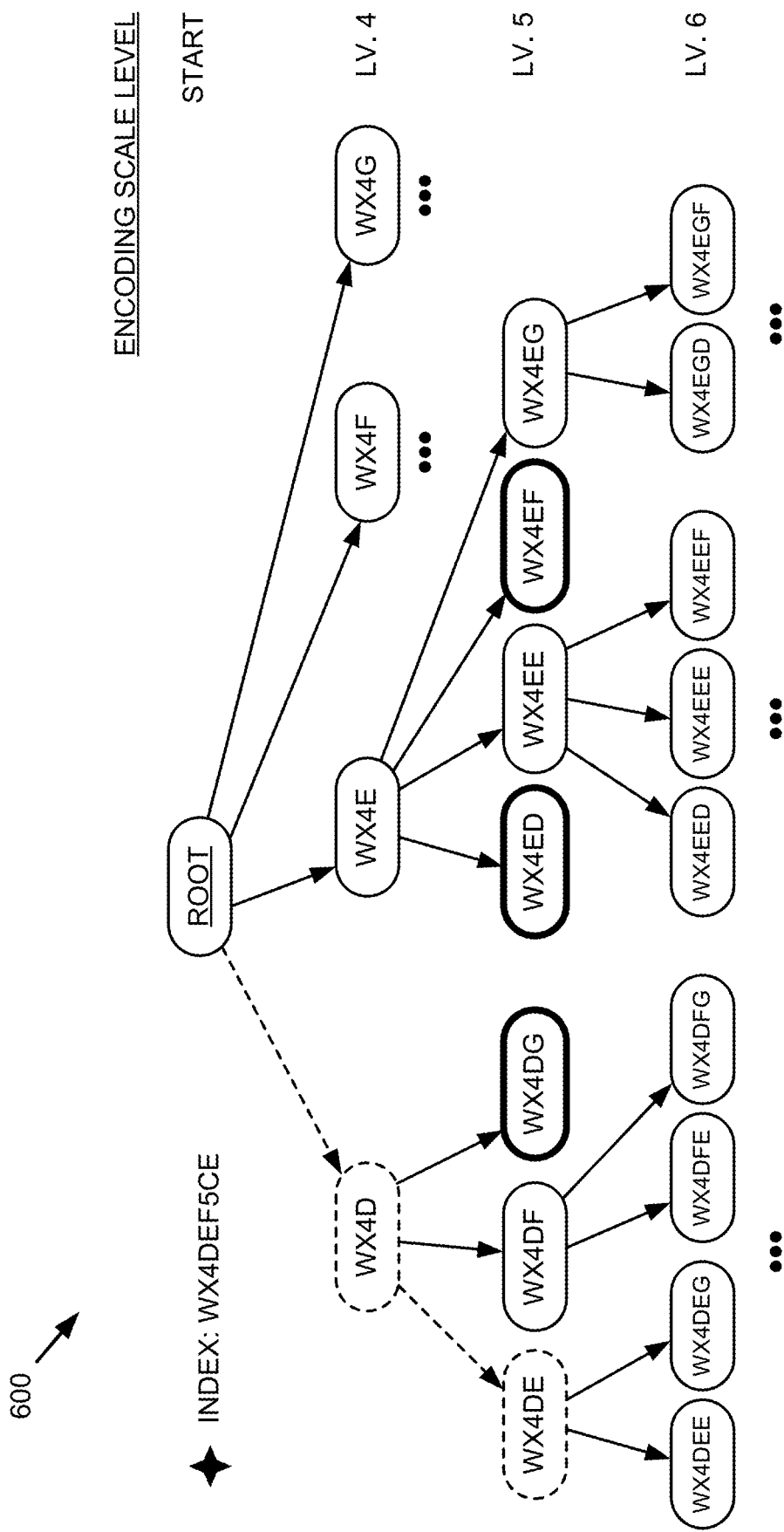
FIG. 6 is a diagram illustrating an example, non-limiting tree traversal process that facilitates efficient context-related positioning in accordance with one or more embodiments described herein.

Returning to FIG. 1, the data structure 10 utilized by scanning component 104 can either include or be generated based on a hierarchical structure as described above with respect to diagrams 502, 504, 506. The hierarchy associated with the regional indexes can be leveraged to build a tree structure from the indexes, as shown by diagram 600 in FIG. 6. Using this tree structure, the scanning component 104 can determine a context-relevant relationship between a target location and a land area as follows. First, the target location is encoded and given an index. In one example, the target location can be encoded as a geohash and given a geohash index. This encoding may be done client-side, e.g., performed at a client device and then provided to system 100, or server-side, e.g., performed by scanning component 104 and/or another component of system 100.

Next, the scanning component 104 can use the index of the target location to scan a data structure for a land area.

Diagram 600 illustrates an example scanning operation for a target location having an index WX4DEF5CE and a land area having a data structure in the form of a hash tree constructed as shown by diagrams 502, 504, 506. Repetitive description of like elements employed in other embodiments described herein is omitted for sake of brevity.

In some embodiments, scanning can begin at a tree level corresponding to the first level of the structure associated with the hash tree by identifying a node at the current tree level having an index that matches a beginning portion (e.g., initial substring) of the target location index. If such a node is found and the node is a full cover node (denoted on diagram 600 using heavy outlining), scanning can be completed and the location determination component 106 can classify the target location as within (e.g., encompassed by) the land area. Otherwise, scanning can continue for subsequent levels of the hash tree until either a scale level associated with the search is reached (e.g., a resolution associated with the scale level is accepted by a context that invoked the search) or a node having an index that matches the beginning portion of the target location index is not found. Scanning as performed by the scanning component 104 with respect to the location WX4DEF5CE can be shown in diagram 600 via dashed lines. If the scale level accepted for the scan shown in diagram 600 is level 5, the scan can stop upon reaching node WX4DE and the location determination component 106 can classify the target location as intersecting (e.g., at least partially within) the land area. Alternatively, if the scale level accepted for the scan is level 6 or greater, the hash tree does not contain a node having an index of WX4DEF. As a result, the scan can terminate upon reaching level 6 and the location determination component 106 can classify the target location as not intersecting or within the land area.

Figure 7:
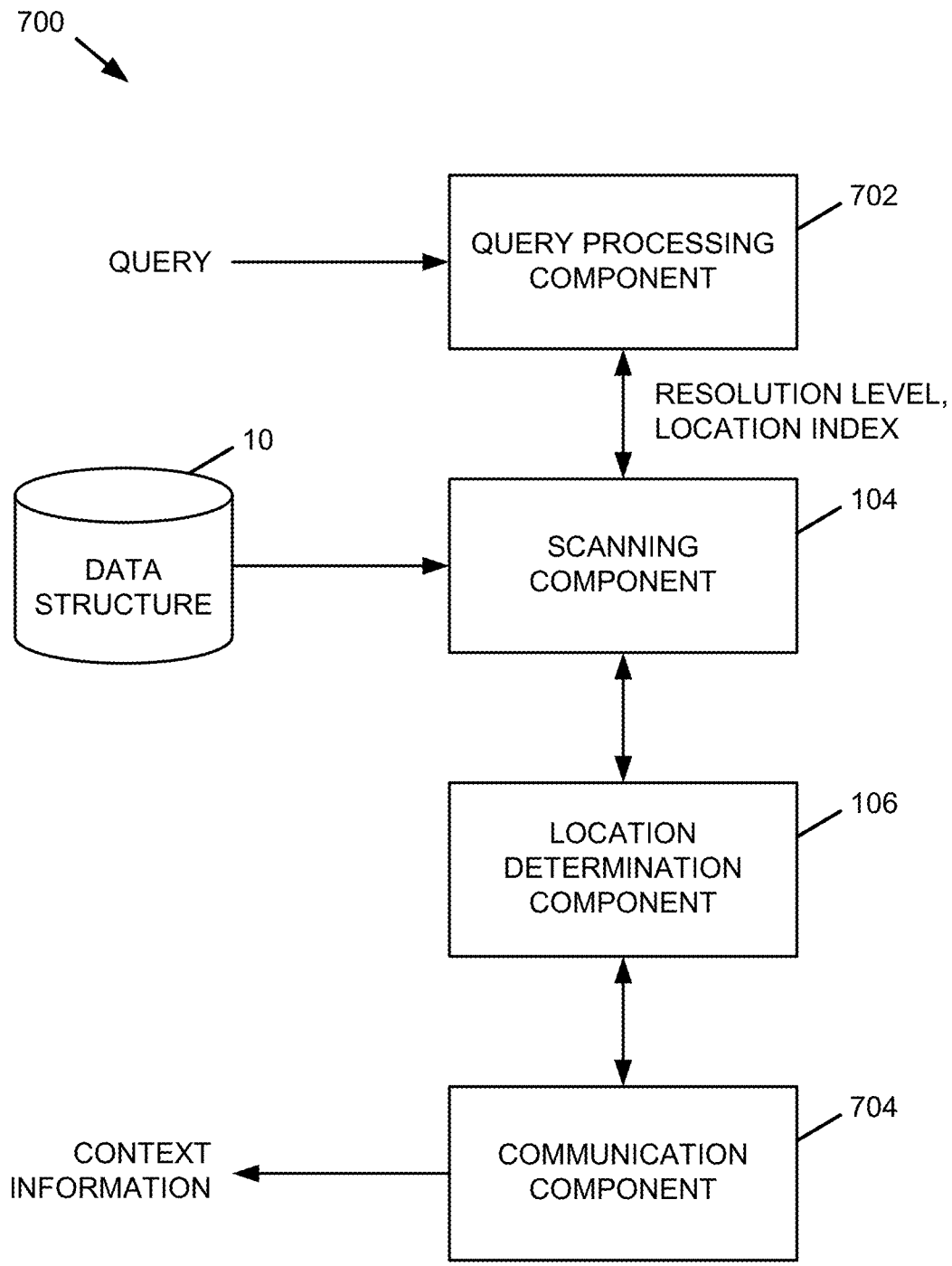
FIG. 7 is another block diagram of an example, non-limiting system that facilitates context-relevant positioning in accordance with one or more embodiments described herein.

Turning next to FIG. 7, another system 700 for context-relevant spatial computing is illustrated in accordance with one or more embodiments. Repetitive description of like elements employed in other embodiments described herein is omitted for sake of brevity. System 700 includes a scanning component 104 and a location determination component 106, which function in accordance with one or more aspects described above. In addition, system 700 can include a query processing component 702 and a communication component 704. In one aspect, the query processing component 702 can receive a query, e.g., from a remote device via a network, containing information relating to the target location and/or the accepted resolution level. Other messages containing the specified information, and/or other methods of obtaining the specified information, can also be used. The network(s) over which the query can be received can include wired network(s) and/or wireless network(s), including, but not limited to, local area networks (LANs), wide area networks (WANs) such as the Internet and/or networks that provide interconnections for devices associated with a defined workspace. Some of the information received by the query processing component 702 can be implicit from other received information; for example, a query or other message can provide the identity of a context, from which the query processing component 702 can assign and/or otherwise select a resolution level that is associated with the context. Additionally, the location received by the query processing component 702 can be sent unindexed, in which case the query processing component 702 can assign an index to the location according to latitude/longitude information associated with the location and/or other information.

In another aspect, the communication component 704 can receive the determination of the location determination component 106 and can transmit data relevant to one or more contexts (e.g., context(s) indicated in information received by the query processing component 702) based on the determination. For instance, if the query processing component 702 receives a request for information related to a target location and a requested context C, and the location determination component can determine that the target location is within and/or intersecting a land area L, the communication component can prepare and transmit information related to context C for land area L. By way of non-limiting example, if a request for weather information is received for a particular location, and the location is determined to be within the state of Washington, the communication component 704 can transmit weather data for the state of Washington based on the request. The communication component 704 can additionally or alternatively provide information for areas surrounding a land area scanned by the scanning component 104 in some cases. Returning to the previous example, if the location is instead found to be outside the state of Washington, the communication component 704 can instead provide weather information for an area adjacent to and/or otherwise near the state of Washington. In another case, if the location is determined to be intersecting but not fully encompassed by the state of Washington, the communication component 704 can provide weather information for the state of Washington in addition to one or more surrounding areas. Other methods of providing context-related data based on a location determination can also be used.

Context-relevant information may be transmitted from the communication component 704 directly to a device from which a request for the information was received (e.g., a client device) and/or indirectly via an intermediary device (e.g., an information server, web server, etc.) connected to the requesting device via one or more communication networks. Further, the communication component 704 can communicate via any suitable wired and/or wireless technology and can provide information in response to a request via a same technology over which the request was received and/or a different technology.

While the above description relates to a system 700 that includes both the query processing component 702 and the communication component 704, it should be appreciated that various embodiments described herein can include and/or incorporate the functionality of one, both, or none of the query processing component 702 and/or the communication component 704 without departing from the scope of the subject description and claimed subject matter.

Figure 8:
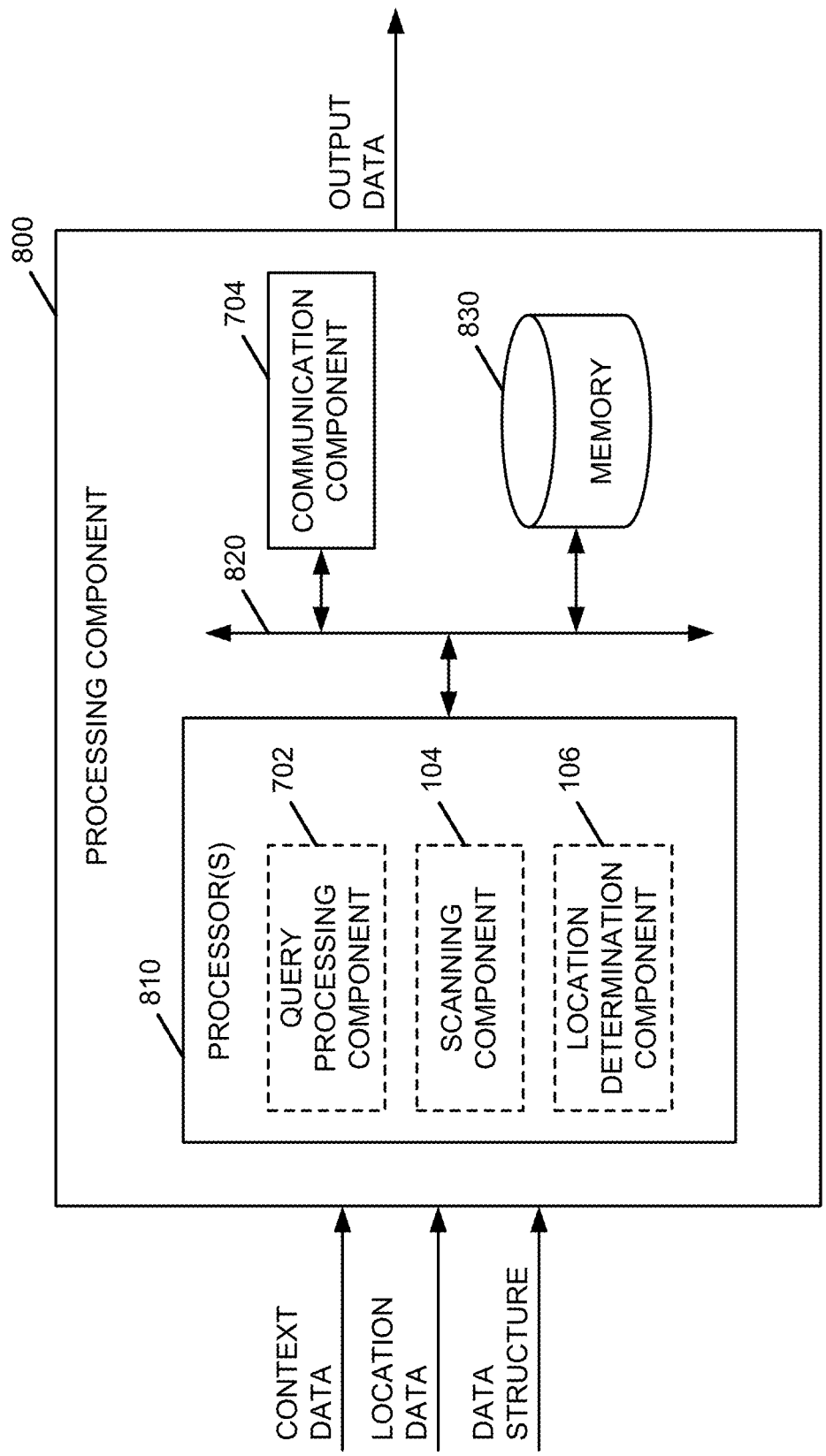
FIG. 8 is a block diagram of an example, non-limiting processing component in accordance with one or more embodiments described herein.

Referring next to FIG. 8, a processing component 800 that can be utilized to implement one or more aspects described herein is illustrated in accordance with one or more embodiments. Repetitive description of like elements employed in other embodiments described herein is omitted for sake of brevity.

As shown in FIG. 8, the processing component 800 can be associated with at least one processor 810 (e.g., a central processing unit, a graphical processing unit, etc.), which can be utilized to implement one or more of the query processing component 702, scanning component 104, and/or location determination component 106 as described above. The processor(s) 810 can be connected via a data bus 820 to one or more additional sub-components of the processing component 800, such as the communication component 704 and/or a memory 830. While the communication component 704 is illustrated as implemented separately from the processor(s)

810, the processor(s) 810 in some embodiments can additionally be used to implement the communication component 704. In still other embodiments, the communication component 704 may be external to the processing component 800 and communicate with the processing component 800 via a separate communication link.

In various embodiments, the processing component 800 can be or include hardware, software (e.g., a set of threads, a set of processes, software in execution, etc.) or a combination of hardware and software that performs a computing task (e.g., a computing task associated with received data). For example, processing component 800 can execute spatial computing operations that cannot be performed by a human (e.g., are greater than the capability of a human mind). For example, the amount of data processed, the speed of processing of the data and/or the data types processed by processing component 800 over a certain period of time can be respectively greater, faster and different than the amount, speed and data type that can be processed by a single human mind over the same period of time. For example, data processed by processing component 800 can be raw data (e.g., raw textual data, raw numerical data, etc.) and/or compressed data (e.g., compressed textual data, compressed numerical data, etc.) associated with one or more computing devices. Moreover, processing component 800 can be fully operational towards performing one or more other functions (e.g., fully powered on, fully executed, etc.) while also processing the above-referenced data.

The memory 830 can be utilized by the processing component 800 to store data utilized by the processing component 800 in accordance with one or more embodiments described herein. Additionally or alternatively, the memory 830 can have stored thereon machine-readable instructions that, when executed by the processing component 800, cause the processing component (and/or one or more processors 810 thereof) to implement the query processing component 702, scanning component 104, and/or location determination component 106 as described above.

By employing one or more of the embodiments described herein, processing performance (e.g., central processing unit (CPU) cycles, processing speed, relative efficiency, throughput, etc.) of a processor that implements the query processing component 702, scanning component 104, and/or location determination component 106 can be improved. Additionally or alternatively, one or more of the embodiments described herein facilitate the positioning of a location relative to an area of interest in the absence of additional positioning data.

Figure 9:
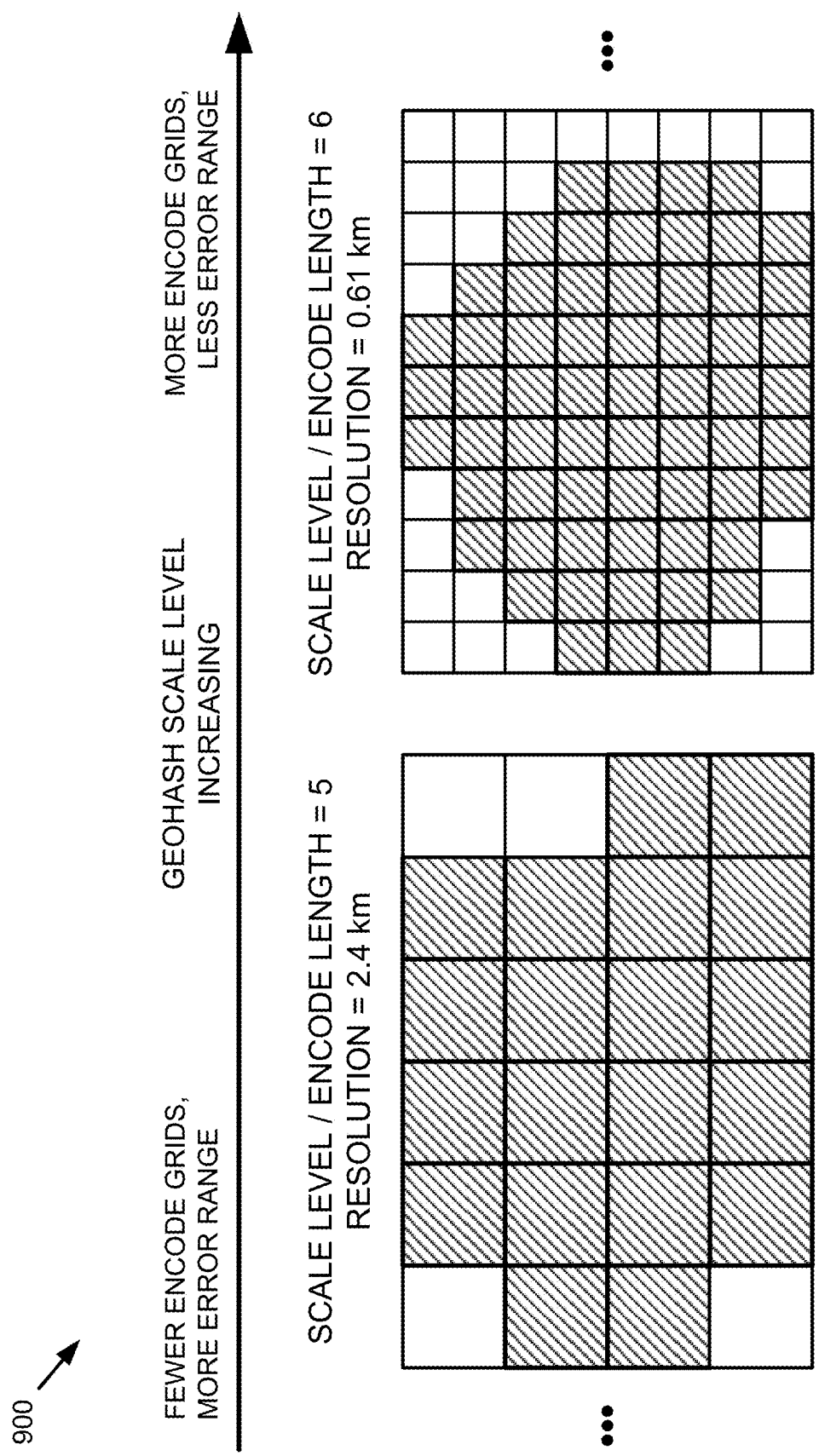
FIG. 9 is a diagram illustrating an example, non-limiting hierarchical encoding process that facilitates positioning within a land area for multiple contexts in accordance with one or more embodiments described herein.

Referring next to FIG. 9, non-limiting example of an encoding scheme that can be utilized for the data structure 10 is shown by diagram 900. Repetitive description of like elements employed in other embodiments described herein is omitted for sake of brevity.

Figure 10:
FIG. 10 is a diagram illustrating example, non-limiting encoding resolutions in accordance with one or more embodiments described herein.

As shown by diagram 900, the number of encoded regions can increase and the error range associated with the encoding structure can decrease for increasing scale levels of the encoding structure. Diagram 900 shows an example in which a fifth scale level has a resolution of 2.4 kilometers (km) and a sixth scale level has a resolution of 0.61 km. Example scale levels and corresponding resolutions that can be utilized for this example are further illustrated by diagram 1000 in FIG. 10 for scale levels 1-10. Other scale level definitions can also be used in different embodiments.

In an aspect, different scale levels of a data structure can be associated with respective contexts. By way of a non-limiting example, weather information can utilize scale levels 4-5, air quality can utilize scale level 6, and/or traffic/road conditions can utilize scale levels 7-8. Other scale levels can also be used in other embodiments.

Figure 11:
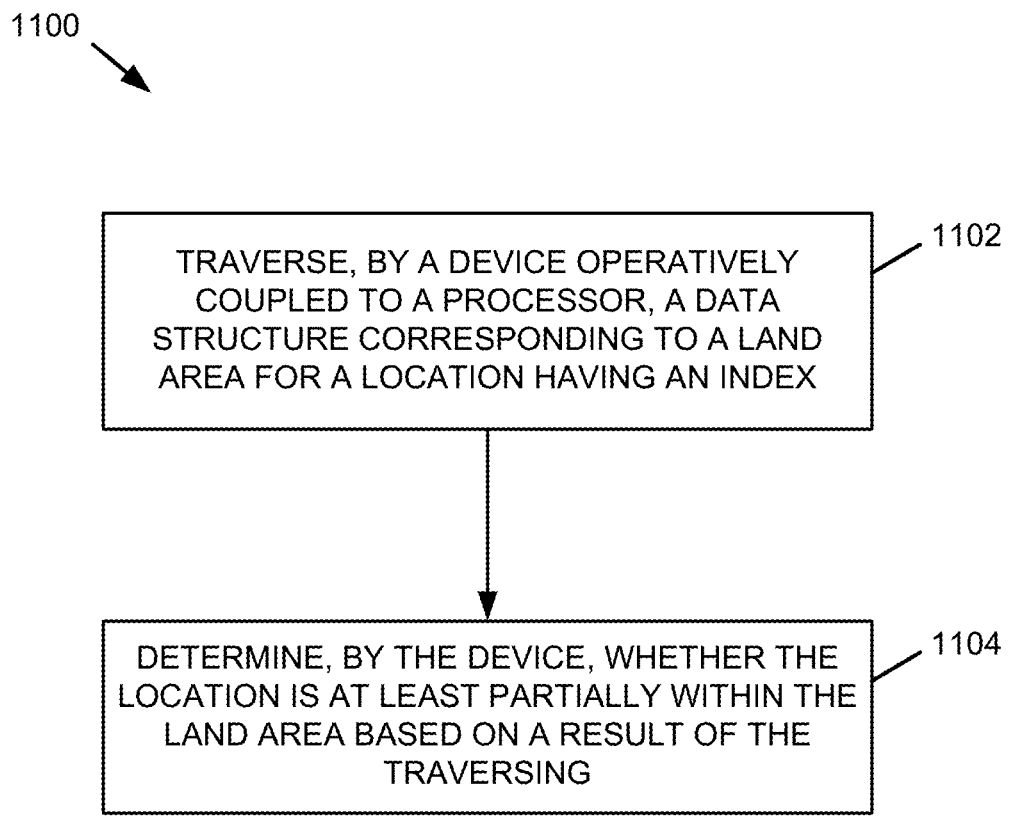
FIG. 11 is a flow diagram of an example, non-limiting computer-implemented method that facilitates context-relevant positioning in accordance with one or more embodiments described herein.

FIG. 11 illustrates a flow diagram of an example, non-limiting computer-implemented method 1100 that facilitates resolution-based spatial computing in accordance with one or more embodiments described herein. Repetitive description of like elements employed in other embodiments described herein is omitted for sake of brevity.

At 1102, a data structure corresponding to a land area is traversed (e.g., by a scanning component 104) for a location having an index. The location and/or its index can be provided to one or more components performing 1102 by a separate component (e.g., a query processing component 702) and/or made available by other means.

At 1104, a determination is made (e.g., by a location determination component 106) whether the location is at least partially within the land area based on a result of the traversing performed at 1102.

Figure 12:
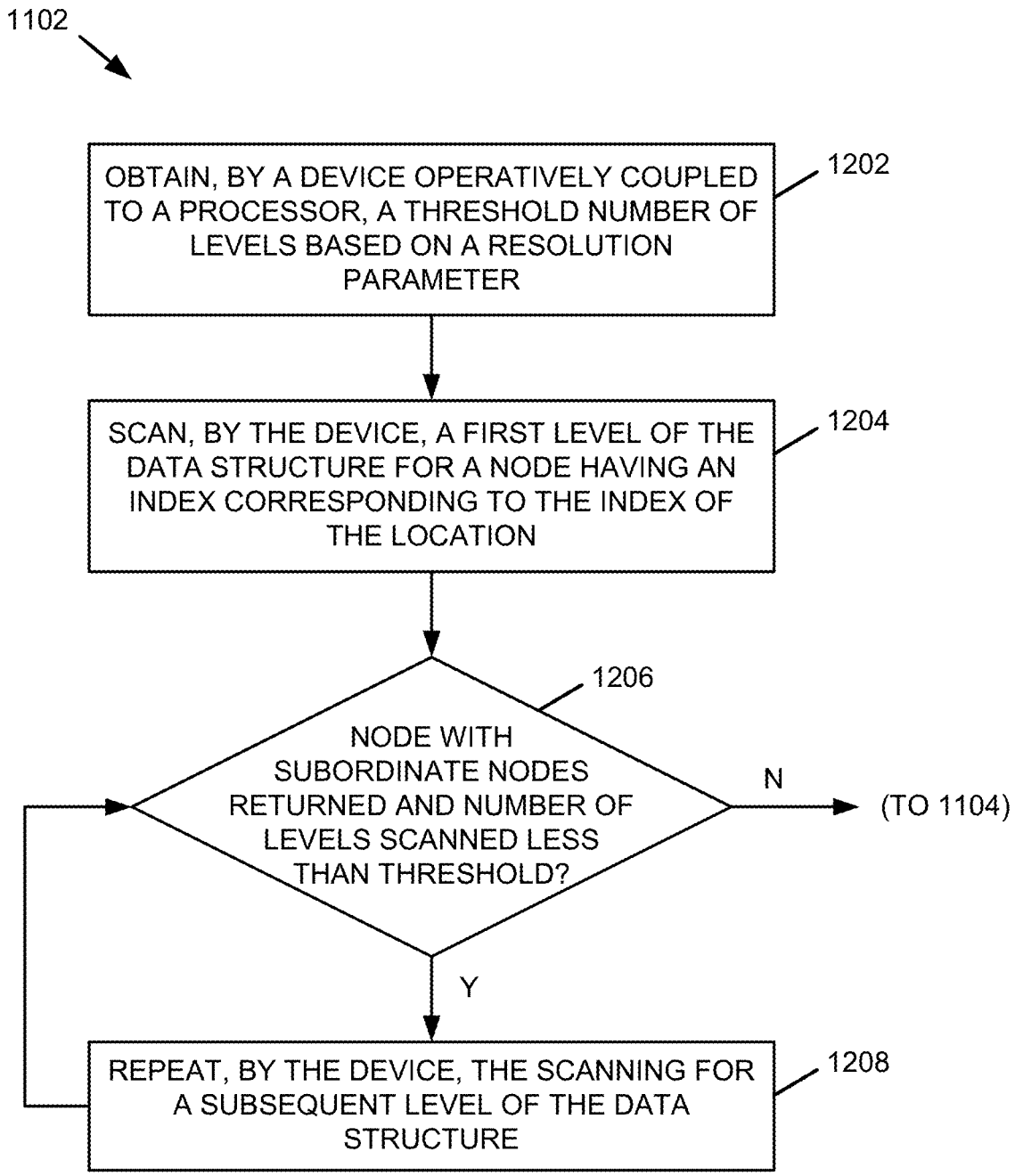
FIG. 12 is a flow diagram of an example, non-limiting computer-implemented method for performing the tree traversal illustrated by FIG. 11 in accordance with one or more embodiments described herein.

FIG. 12 illustrates a flow diagram of an example, non-limiting computer-implemented method by which the traversing performed at 1102 in FIG. 11 can be performed. Repetitive description of like elements employed in other embodiments described herein is omitted for sake of brevity.

At 1202, a threshold number of levels is obtained (e.g., by the scanning component 104 and/or the query processing component 702) based on a resolution parameter. As with 1102 above, the resolution parameter can be made available to one or more components performing 1202 by a separate component (e.g., the query processing component 702) and/or made available by other means.

At 1204, a first level of the data structure is scanned (e.g., by the scanning component 104) for a node having an index corresponding to the index of the location.

At 1206, if the scanning at 1204 results in discovery of a node with subordinate nodes, and the number of data structure levels scanned is less than the threshold number of levels obtained at 1202, the traversing 1102 proceeds to 1208. Otherwise, the traversing 1102 terminates and the determining 1104 is performed as described above.

At 1208, the scanning performed at 1204 is repeated for a subsequent level of the data structure. The traversing then returns to 1206 and iterates over 1206 and 1208 until an end condition is reached as described above.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components and/or an assignment component is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components and/or an assignment component, etc. Moreover, a human is unable to packetize data that can include a sequence of bits corresponding to information generated during a spatial computing process, transmit data that can include a sequence of bits corresponding to information generated during a spatial computing process, etc.

Figure 13:
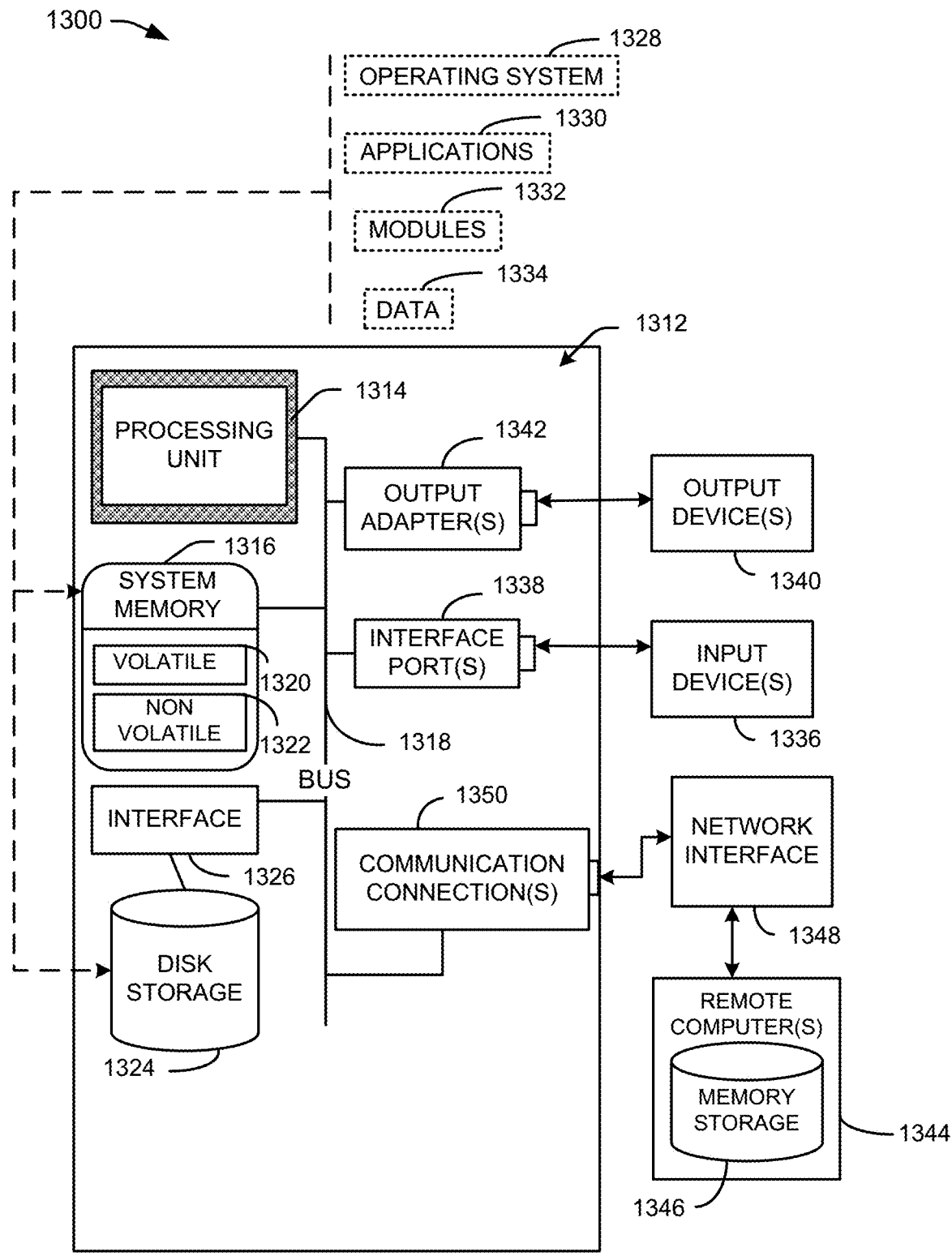
FIG. 13 illustrates a block diagram of an example, non-limiting operating environment in which one or more embodiments described herein can be implemented.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor that executes computer executable components stored in the memory, wherein the computer executable components comprise:
     a query processing component that:
       obtains a specified context and a specified geohash index of a location, and
       identifies an accepted resolution level associated with the specified context based on a data structure that defines respective relationships between contexts and resolution levels of a geohash grid tree data structure of a land area;
     a scanning component that performs a iterative search of levels of the geohash grid tree data structure up to a threshold number of levels, starting from a first level of the levels corresponding to a largest resolution level of the resolution levels through subsequent levels of the levels, for a node having a geohash index corresponding to the specified geohash index of the location, and having at least one of: no subordinate nodes or a resolution level not being lower than the accepted resolution level; and wherein the threshold number of levels is based at least in part upon a resolution parameter; and
     a location determination component that determines whether the location is at least partially within the land area based on a result of the search.

2. The system of claim 1, wherein the location determination component also determines that the location is encompassed by the land area based on the iterative search returning the node having no subordinate nodes.

3. The system of claim 1, wherein the location determination component determines that no portion of the location intersects the land area based on the iterative search returning no node having the geohash index corresponding to the specified geohash index of the location.

4. The system of claim 1, wherein the geohash grid tree data structure corresponds to a geohash grid for the land area.

5. The system of claim 1, wherein the location determination component determines that the location is at least partially within the land area based on the iterative search returning the node having the resolution level not being lower than the accepted resolution level.

6. The system of claim 1, wherein the information context parameter and the accepted resolution level facilitate a determination by the location determination component of a position of the location relative to the land area in an absence of additional positioning data and reduced processing cycles for the scanning component and the location determination component to produce the determination.

7. The system of claim 6, wherein the computer executable components further comprise a communication component that transmits information related to the information context parameter for the land area based on the location determination component determining that the location at least partially intersects the land area.

8. A computer-implemented method comprising:
   traversing, by a device operatively coupled to a processor, a geohash grid tree data structure corresponding to a land area for a location having a specified geohash index, wherein the traversing comprises:
     identifying an accepted resolution level associated with a specified context based on a data structure that defines respective relationships between contexts and resolution levels of the geohash grid tree data structure
     iteratively searching levels of the geohash grid tree data structure up to a threshold number of levels, starting from a first level of the levels corresponding to a largest resolution level of the resolution levels through subsequent levels of the levels, for a node having a geohash index corresponding to the specified geohash index of the location, and having at least one of: no subordinate nodes or a resolution level not being lower than the accepted resolution level; and wherein the threshold number of levels is based at least in part upon a resolution parameter; and
   determining, by the device, whether the location is at least partially within the land area based on a result of the traversing.

9. The computer-implemented method of claim 8, further comprising determining that the location is encompassed by the land area based on the searching returning the node having no subordinate nodes.

10. The computer-implemented method of claim 8, further comprising determining that no portion of the location is within the land area based on the searching returning no node having the geohash index corresponding to the specified geohash index of the location.

11. The computer-implemented method of claim 10, wherein the geohash grid tree data structure corresponds to a geohash grid for the land area.

12. The computer-implemented method of claim 11, further comprising determining that the location is at least partially within the land area based on the iterative search performed by the scanning component returning the node having the resolution level not being lower than the accepted resolution level.

13. The computer-implemented method of claim 11, further comprising:
   dividing, by the device, the land area into sections to form the geohash grid.

14. The computer-implemented method of claim 8, further comprising transmitting information for the land area related to the specified context based on determining that the location at least partially intersects the land area.

15. A computer program product for spatial computing, the computer program product comprising a computer readable storage medium having program instructions embodied therewith, the program instructions executable by a processing component to cause the processing component to:
- obtain, by the processing component, a specified context and a specified geohash index of a location;
- identify, by the processing component, an accepted resolution level associated with the specified context based on a data structure that defines respective relationships between contexts and resolution levels of a geohash grid tree data structure of a land area;
- iteratively search, by the processing component, levels of the geohash grid tree data structure up to a threshold number of levels, starting from a first level of the levels corresponding to a largest resolution level of the resolution levels through subsequent levels of the levels, for a node having a geohash index corresponding to the specified geohash index of the location, and having at least one of: no subordinate nodes or a resolution level not being lower than the accepted resolution level; and wherein the threshold number of levels is based at least in part upon a resolution parameter; and
- determine, by the processing component, whether the location is at least partially within the land area based on a result of the iterative search.

16. The computer program product of claim 15, wherein the program instructions are further executable by the processing component to cause the processing component to:
- determine, by the processing component, that the land area encompasses the location based on the iterative search returning the node having no subordinate nodes.

17. The computer program product of claim 15, wherein the program instructions are further executable by the processing component to cause the processing component to:
- determine, by the processing component, that no portion of the location intersects the land area based on the iterative search returning no node having the geohash index corresponding to the specified geohash index of the location.

18. The computer program product of claim 15, wherein the program instructions are further executable by the processing component to cause the processing component to:
- determine, by the processing component, that the location at least partially intersects the land area based on the on the iterative search returning the node having the resolution level not being lower than the accepted resolution level.

19. The computer program product of claim 15, wherein the geohash grid tree data structure corresponds to a geohash grid for the land area.

20. The computer program product of claim 15, wherein the program instructions are further executable by the processing component to cause the processing component to:
- divide the land area into sections to form the geohash grid.

* * * * *